United States Patent
Deegener et al.

(10) Patent No.: US 8,616,646 B2
(45) Date of Patent: Dec. 31, 2013

(54) ADJUSTER FOR A VEHICLE SEAT

(75) Inventors: Elmar Deegener, Stelzenberg (DE);
Heinz Voss, Leverkusen (DE); Rolf Schüler, Heiligenhaus (DE); Bernd Bossmanns, Erkrath (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 468 days.

(21) Appl. No.: 12/916,723

(22) Filed: Nov. 1, 2010

(65) Prior Publication Data
US 2011/0101752 A1  May 5, 2011

(30) Foreign Application Priority Data
Nov. 4, 2009 (DE) .......................... 10 2009 052 582

(51) Int. Cl.
*B60N 2/02* (2006.01)
(52) U.S. Cl.
USPC ........................................ 297/362; 297/361.1
(58) Field of Classification Search
USPC ......... 74/393, 435, 437, 439, 508; 297/361.1, 297/362
See application file for complete search history.

(56) References Cited

U.S. PATENT DOCUMENTS

| | | | |
|---|---|---|---|
| 1,508,564 A * | 9/1924 | Mathews | 74/437 |
| 2,585,971 A * | 2/1952 | Sloane | 74/393 |
| 2,748,618 A * | 6/1956 | Lee | 74/439 |
| 4,054,966 A * | 10/1977 | Putsch et al. | 16/324 |
| 4,121,802 A * | 10/1978 | Kluting et al. | 248/421 |
| 5,634,689 A | 6/1997 | Putsch et al. | |
| 6,402,248 B1 * | 6/2002 | Lloyd et al. | 297/362 |
| 6,591,708 B2 * | 7/2003 | Kobayashi et al. | 74/446 |
| 6,918,635 B2 * | 7/2005 | Finner et al. | 297/362 |
| 7,306,285 B2 | 12/2007 | Schuler et al. | |

FOREIGN PATENT DOCUMENTS

| | | |
|---|---|---|
| DE | 44 36 101 A1 | 1/1995 |
| DE | 103 41 001 B3 | 3/2005 |
| EP | 1 423 294 B1 | 6/2004 |

* cited by examiner

*Primary Examiner* — Philip Gabler
(74) *Attorney, Agent, or Firm* — McGlew and Tuttle, P.C.

(57) ABSTRACT

An adjuster for a vehicle seat, in particular for a motor vehicle seat, includes a drive, a gear stage (8) driven by the drive. The gear stage (8) includes a drive wheel (81) rotatable about a first rotational axis (A1) and drive teeth (81*a*) and a driven wheel (82) rotatable about a second rotational axis (A2) and including driven teeth (82*a*). Driven wheel (82) meshes with the drive wheel (81) with a fluctuating gear ratio and at least one load bearing gear driven by the gear stage, in particular a geared fitting. The fitting parts thereof performing a relative rotation with a superimposed wobble motion. At least two drive teeth (81*a*) and/or at least two driven teeth (82*a*) in the circumferential direction of the associated rotational axis (A1, A2) have different dimensions and/or different spacings from the adjacent teeth, and/or in the axial direction of the associated rotational axis (A1, A2), different dimensions and/or different axial positions.

18 Claims, 6 Drawing Sheets

ADJUSTER FOR A VEHICLE SEAT

CROSS REFERENCE TO RELATED APPLICATIONS

This application claims the benefit of priority under 35 U.S.C. §119 of German Patent Application DE 10 2009 052 582.3 filed Nov. 4, 2009, the entire contents of which are incorporated herein by reference.

FIELD OF THE INVENTION

The invention relates to an adjuster for a vehicle seat having a drive, a gear stage driven by the drive and at least one load bearing gear.

BACKGROUND OF THE INVENTION

An adjuster of this type is disclosed in DE 103 41 001 B3 (see also corresponding U.S. Pat. No. 7,306,285). Relative to a conventional gear stage, the rotational axes of the drive wheel and driven wheel are arranged offset to the respective center of gravity. The gear ratio fluctuating around 1:1 (or a whole number multiple thereof), compensates for the fluctuating torque requirement of the geared fitting. These fluctuations in the torque requirement are produced by the continuous directional alteration of the eccentricity of the eccentric epicyclic gearing, which is represented as a wobble motion. As a result, the effective lever arms are also altered and the mass of the components to be adjusted performs a minimum upward and downward motion. Without the gear stage, in a motorized drive a periodic alteration to the speed and thus an alteration to the noise would occur which would interfere with the subjective impression of quality for the occupant.

SUMMARY OF THE INVENTION

The object of the invention is to improve an adjuster of the aforementioned type.

According to the invention an adjuster is provided for a vehicle seat, in particular for a motor vehicle seat comprising a drive and a gear stage driven by the drive. The gear stage comprises a drive wheel, rotatable about a first rotational axis and comprising drive teeth, and a driven wheel, rotatable about a second rotational axis and comprising driven teeth, which meshes with the drive wheel with a fluctuating gear ratio. At least one load bearing gear is driven by the gear stage, in particular a geared fitting, the fitting parts thereof performing a relative rotation with a superimposed wobble motion. At least two drive teeth and/or at least two driven teeth in the circumferential direction of the associated rotational axis have different dimensions and/or different spacings from the adjacent teeth, and/or in the axial direction of the associated rotational axis, different dimensions and/or different axial positions.

As the drive teeth and/or the driven teeth in the circumferential direction of the associated rotational axis have different dimensions, in particular shapes, and/or different spacings from the adjacent teeth, i.e. different tooth spacings, and/or in the axial direction of the associated rotational axis different dimensions and/or different axial positions, both the fluctuating torque requirement of the geared fitting may be—at least partially—compensated by the gear stage and a gear ratio is created which deviates from 1:1 or a whole number multiple thereof (1:n or n:1, where n is a whole number). Between the drive teeth and the driven teeth, any tooth pairings are possible and thus any gear ratios may be set. In theory, the differences in the teeth may occur both in the circumferential direction and in the axial direction. If they occur in the axial direction, the contact zones of the teeth exhibit the aforementioned differences, whilst other zones of the teeth have filling material, which is only effective in the case of high loads.

By means of the gear stage configured according to the invention, components and thus constructional space and costs are saved. In order to avoid imbalances, the center of gravity (mass) of the respective gear wheel is generally located on the rotational axis. If asymmetries occur as a result of the different dimensions and/or axial positions, said asymmetries may be again compensated by a mirror-symmetrical duplication of the relevant gear wheel.

The gear ratio is achieved by different diameters of the drive wheel and driven wheel. The diameter primarily means the tip diameter but also the root diameter and all other diameters which are specific to the teeth, for example the diameter of the base circle of an evolute.

In order to produce the fluctuating gear ratio by means of the drive teeth and driven teeth, preferably the axial direction of the rotational axes is utilized. Preferably, one of the gear wheels, for example the smaller drive wheel, in the axial direction specifies different toothing planes, in which the dimensions of the teeth are different from the dimensions of the teeth in the other respective toothing planes. In the limit case, a frustoconical-like configuration results. A large cone opening angle is advantageous. The teeth of the respective other gear wheel, for example of the larger driven wheel, are adapted thereto. The different toothing planes are produced accordingly. The change to the next toothing plane depends on the number of dividing planes in the circumferential direction. In the limit case of an unlimited number of dividing planes of infinitesimally small dimensions in the axial direction, an annular arrangement is produced in a plane located obliquely to the rotational axes.

The adjuster according to the invention may be provided as an inclination adjuster for a backrest, in which during the pivoting motion the center of gravity of the backrest is raised and lowered by a wobble motion of the geared fitting, and as a result the torque requirement is altered. A use of the adjuster according to the invention is also expedient for a height adjuster or inclination adjuster, in which the seat cushion is moved, as large forces are necessary therefor. Accordingly, in principle, each vehicle seat may be provided with an adjuster according to the invention which, when actuated, ultimately moves a component or whole subassembly of the vehicle seat. It is also possible to provide a gear stage with the configuration of the drive teeth and driven teeth according to the invention outside the field of vehicle seats (and the adjusters thereof).

The invention is described in more detail hereinafter with reference to an exemplary embodiment shown in the drawings with different gear stages. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
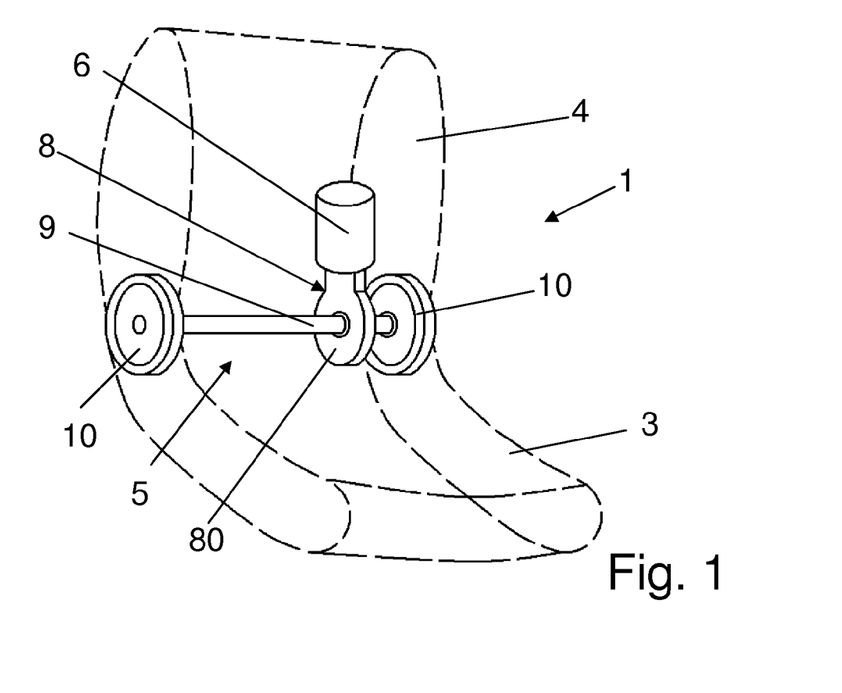
FIG. 1 is a schematic, perspective view of the exemplary embodiment.

Referring to the drawings in particular, a vehicle seat 1 for a motor vehicle comprises a seat part 3 and a backrest 4 which is pivotable relative to the seat part 3. In order to move a component of the vehicle seat 1, for example for adjusting the inclination of the backrest 4 relative to the seat part 3 or for adjusting the height of the seat surface of the seat part 3 (together with the backrest 4) relative to the vehicle floor (for example by means of a four bar linkage on both vehicle seat sides, or a scissor-type stand), the vehicle seat 1 has an adjusting device which is denoted hereinafter as an adjuster 5.

The adjuster 5 comprises a motorized or manual drive 6, for example an electric motor or a hand wheel, a gear stage 8 driven by the drive 6 and at least one geared fitting 10 driven by the gear stage 8—preferably by means of a shaft 9. Two geared fittings 10 (preferably one on each vehicle seat side) are provided which are connected to one another by transmission, by the common shaft 9 driven by the gear stage 8.

In the geared fitting 10 two fitting parts are joined together by means of a—preferably self-locking—eccentric epicyclic gearing, as is disclosed for example in EP 1 423 294 B1 or DE 44 36 101 A1, the disclosure thereof relative thereto being expressly included in the invention (and corresponding U.S. Pat. No. 6,918,635 and U.S. Pat. No. 5,634,689 are hereby incorporated by reference in their entirety). The fitting parts of the geared fitting 10 are connected to the structural parts of the vehicle seat 1 to be adjusted relative to one another, thus are located in the flux of force, so that the geared fitting 10 represents the load bearing gear within the adjuster 5. By the rotation of an eccentric inside the geared fitting 10 the eccentricity thereof continuously alters its direction. This provides a rolling motion between a spur gear and an internal toothed ring, which in each case are provided on one of the two fitting parts. The rolling motion is represented as a relative rotation with superimposed wobble motion. A complete rotation of the eccentric effects a rotation of the fitting parts by a few angular degrees. Due to the wobble motion, the lever arms and supporting points are altered within the geared fitting 10 so that a fluctuating torque requirement results.

The gear stage 8 is used firstly for the speed change of the drive 6, i.e. a reduction of the speed of the motor—optionally comprising further gear stages—and an increase in torque and—the at least partial—compensation of the fluctuating torque requirement of the geared fitting 10—due to the wobble motion. The gear stage 8 has a drive wheel 81 rotatable about a first rotational axis $A_1$ and a driven wheel 82 rotatable about a second rotational axis $A_2$, which mesh with one another. The center of gravity (mass) of the gear wheel 81 or 82 is located—generally—on the associated rotational axis $A_1$ or $A_2$. The two gear wheels 81 and 82 are rotatably mounted, in a manner known per se, in a housing 80 (associated with the adjuster 5), the rotational axes $A_1$ and $A_2$ being arranged in parallel, offset to one another. The housing 80 may be provided solely for the gear stage 8 or for the drive 6 and gear stage 8 together.

For producing the desired gear ratio, the diameter of the driven wheel 82 is larger than the diameter of the drive wheel 81. The teeth of the drive wheel 81 and driven wheel 82—in the present case configured as external teeth—are formed specifically for compensating the wobble motion, whereby the gear ratio (and thus the transmitted torque) fluctuate during the revolutions of the drive wheel 81 and driven wheel 82.

The typical torque fluctuation of known geared fittings 10 is in the range of ±8% to ±15% of the mean torque value, so that a fluctuation of the effective gear ratio of approximately ±10% is already sufficient. As the torque fluctuation to be compensated definitively occurs only once per revolution of the driven wheel 82, the effective lever arm of the driven wheel 82 (and thus the gear ratio) should be altered just once per revolution from the minimum to the maximum value—and back again—whilst the drive wheel 81—which is made more rapid by the gear ratio—meshes in all relative positions with the driven wheel 82.

The solution according to the invention thus consists of a cyclical alteration of toothing parameters of the individual teeth of the driven wheel 82, hereinafter denoted as driven teeth 82*a*, and the use of a drive wheel 81 which, with identical teeth, hereinafter denoted as drive teeth 81*a*, in every position has sufficiently good contact conditions with its counter wheel, i.e. the driven wheel 82. Possible variable parameters of the teeth of the driven wheel 82 are, for example, the profile offset, the variation of the engagement angle, the variation of the reference diameter, the variation of the tooth spacing, the variation of the module and a combination of all parameters.

The gear ratio preferably fluctuates by a non-whole number value so that, with regard to the engagement, there is no fixed association between individual drive teeth 81*a* and driven teeth 82*a*.

Figure 2A:
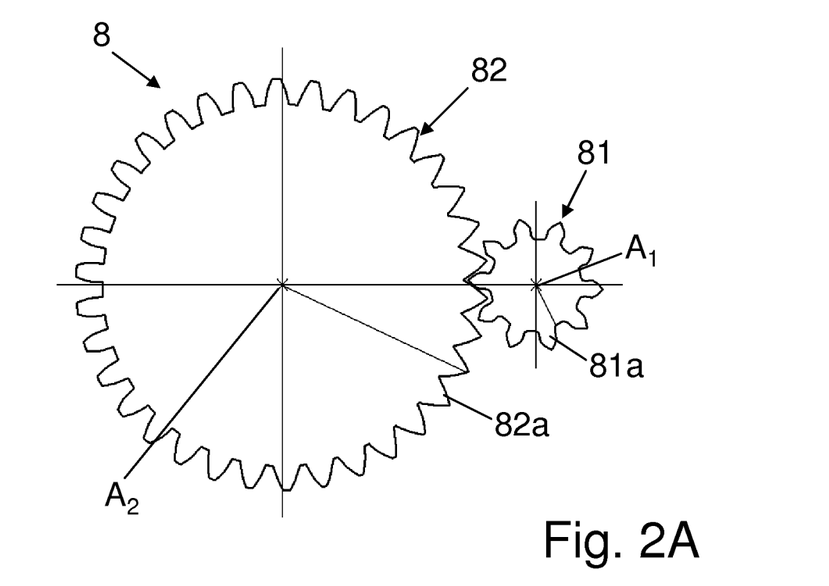
FIG. 2A is a plan view of a gear stage with (only) one toothing plane and varying tooth shapes.
Figure 2B:
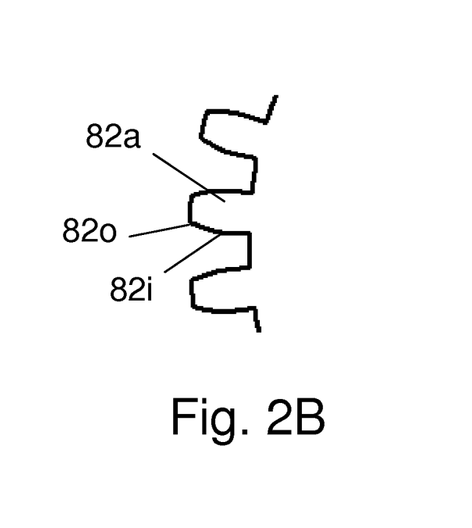
FIG. 2B is an enlarged partial view of the gear stage of FIG. 2A.
Figure 2C:
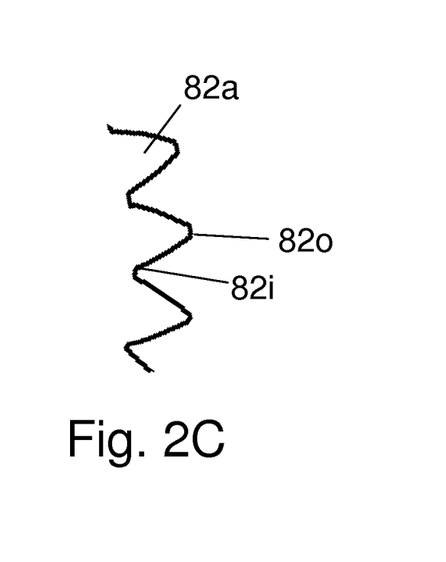
FIG. 2C is a further enlarged partial view of the gear stage of FIG. 2A.

Such an exemplary gear stage with variable tooth shapes is shown in FIG. 2A. With different tooth shapes, different engagement angles are achieved. Detailed views of two diametrically opposing driven teeth 82*a* are shown in FIG. 2B and FIG. 2C. In the driven tooth 82*a* shown in FIG. 2B, which is shown to the left in FIG. 2A, on the inner tooth flank end 82*i*, the engagement angle is 13°, whilst on the outer tooth flank end 82*o* the engagement angle is 16°. In the driven tooth 82*a* shown in FIG. 2C, which is shown to the right in FIG. 2A, on the inner tooth flank end 82*i* the engagement angle is 17° whilst on the outer tooth flank end 82*o*, the engagement angle is 29°.

Figure 3:
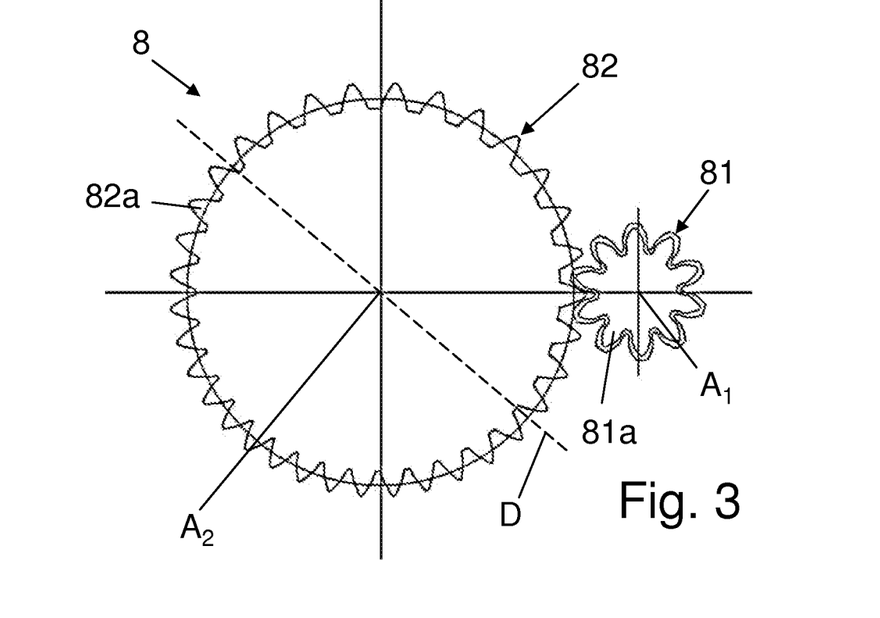
FIG. 3 is a plan view of a gear stage with variable tooth spacing.

A further exemplary gear stage with variable tooth spacing, i.e. variable spacing of the teeth to the adjacent teeth with the same (or similar) tooth shape, is shown in FIG. 3. In order to achieve a continuous, approximately sinusoidal change in the gear ratio over one revolution, the alteration of the tooth spacing is also continuous. The alteration is clearly visible when the two halves of the driven wheel 82 are compared with one another, which are produced by the illustrated diagonal D. In the left lower half, nineteen teeth are arranged and in the right upper half fifteen teeth are arranged. In order to ensure a continuous engagement with the drive wheel 81, in spite of the variable distribution of the teeth of the driven wheel 82, a continuously altering geometry of the drive wheel 81 is used, in which the one extreme geometry exactly matches a complete driven wheel 82 with a high number of teeth and the other extreme geometry exactly matches a complete driven wheel 82 with a low number of teeth, which is shown in FIG. 3 by two outlines. The alteration from one to the other extreme geometry of the drive wheel 81 takes place, therefore, in the axial direction, i.e. over the thickness so that a frustoconical-like drive wheel 81 results. The variation of the tooth spacing of the driven wheel 82, illustrated in FIG. 3, is in practice for optimizing the engagement conditions, preferably in combination with the variation of further parameters such as, in particular, the engagement angle, the profile offset and the reference diameter.

In order to permit the highest possible number of variations, in particular in order to avoid narrow teeth 81*a* or 82*a*, and to maintain sufficient strength, the third spatial dimension is utilized, i.e. the axial direction in the individual cylinder coordinates of the drive wheel 81 and driven wheel 82. Thus a plurality of different drive wheel and driven wheel teeth with imperceptibly different gear ratios are produced, which are neatly arranged in spatial terms. Thus, for example, a drive wheel 81 may be used which at different heights (relative to the first rotational axis $A_1$) has one respective tooth shape for the corresponding gear ratio range in each case over the entire circumference (rotating by 360°) and this drive wheel 81 may be paired with a driven wheel 82 which in the same planes has corresponding counter teeth which, however, are only formed over one part of the circumference.

Figure 4A:
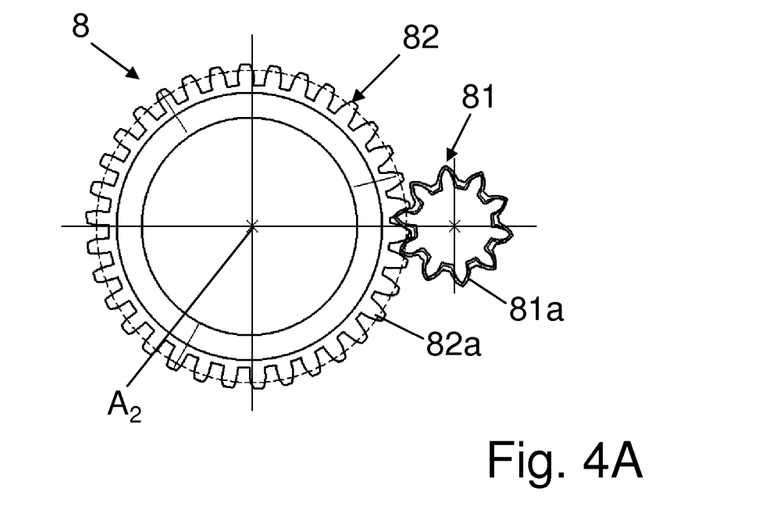
FIG. 4A is a plan view of a gear stage with three toothing planes.
Figure 4B:
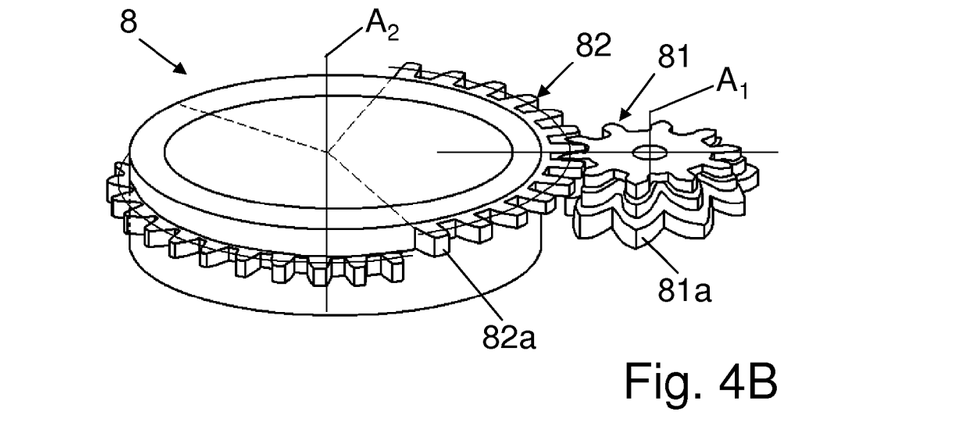
FIG. 4B is a perspective view of the gear stage of FIG. 4A.

A gear stage with three axially offset toothing planes is shown in FIG. 4A and FIG. 4B. Beyond the (axial) thickness of the drive wheel 81 three axially offset toothing planes are provided on the drive wheel 81, i.e. planes with different drive teeth 81*a*, which mesh with a series of correspondingly configured and axially arranged driven teeth 82*a* which, however, are only provided as toothed segments over a partial region in the circumferential direction, in the present case 360°/3=120°. As a result, during one revolution of the drive wheel 81 initially the first toothing plane of drive teeth 81*a* with its corresponding gear ratio will be in engagement with the corresponding toothing plane of the driven teeth 82*a*. After a 120° rotation of the driven wheel 82, the toothing plane changes and thus the gear ratio, and after 240° the third toothing plane is adopted (which is not shown in FIG. 4B). As a result, the range of the possible changes to the gear ratio is markedly increased. With the respective imperceptible and/or continuous alteration of the driven teeth 82*a* with corresponding transitions at the boundaries of the 120° sectors, a continuous (steady) change to the gear ratio is achieved over one revolution of the driven wheel 82.

In order to make the transitions between the toothing planes smoother, the driven teeth 82 may be subdivided into more toothed segments than there are toothing planes present, for example number of toothed segments=2 ◊ (number of toothing planes−1).

Figure 4C:
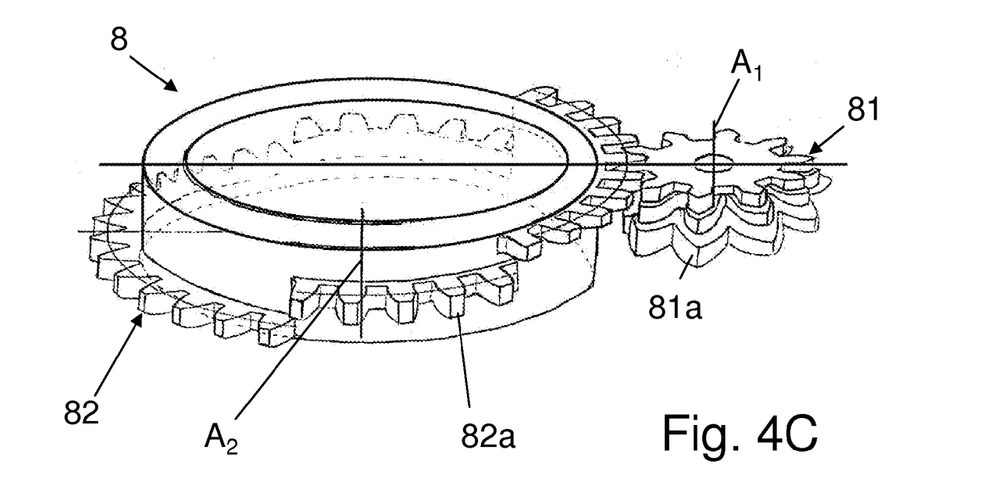
FIG. 4C is a perspective view of a modified gear stage of FIG. 4A.

In FIG. 4C such a modification may be seen in which four toothed segments are arranged in the three toothing planes, and namely in a sequence 120°-60°-120°-60°, i.e. generally for example the toothed segments in the central toothing planes are half as long as in the two outermost toothing planes. Alternatively, all toothed segments are of the same length, i.e. with four toothed segments being in each case 90°.

Figure 5:
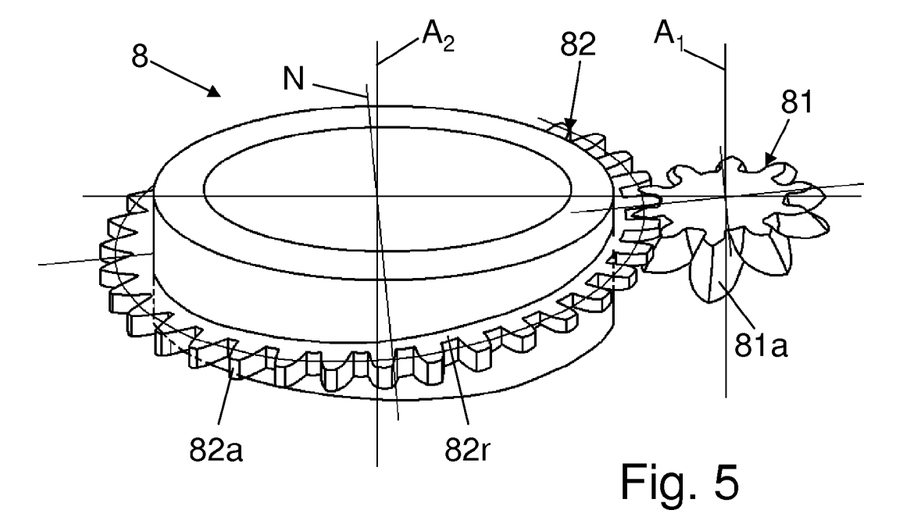
FIG. 5 is a perspective view of a gear stage with infinitesimally thin toothing planes.

If the thickness of the toothing planes of the drive wheel 81, and accordingly the parts of the angular range in the circumferential direction of the driven wheel 82, are selected to be infinitesimally small, a frustoconical-like drive wheel 81 results with a continuous alteration of the tooth shape and a ring 82*r* located obliquely to the axial direction with driven teeth 82*a*, with a similar continuous alteration of the tooth shape. FIG. 5 shows this limit case of a gear stage with infinitesimally thin toothing planes, which for example is produced by refining the subdivision of FIG. 4C. The arrangement of the driven teeth 82*a* along the ring 82*r* in one plane, the normal axis N thereof not being aligned with the second rotational axis $A_2$ of the driven wheel 82 but being located obliquely thereto, follows the (cone) opening angle of the frustoconical-like drive wheel 81, whereby the axial engaging surface is increased.

In addition to the spatially continuous alteration (i.e. the position in the axial direction), a continuous alteration to the tooth parameters may also be provided, such as for example shown in FIGS. 2A to 3, i.e. substantially varying the diameter of the ring of the driven teeth 82*a*, with the purpose of lengthening a contact line with the frustoconical-like drive wheel 81 and/or the spatially different tooth diameters thereof beyond the full tooth height of the driven teeth 82*a*.

It is also possible that a ring 82*r* with driven teeth 82*a* located obliquely to the axial direction, as shown in FIG. 5, is also produced in the gear stage with the variable tooth spacing of FIG. 3. The region with the denser tooth spacing meshes, for example, with the narrower upper part of the drive wheel 81, whilst the region with the thinner tooth spacing, for example, meshes with the wider lower part of the drive wheel 81.

Figure 6A:
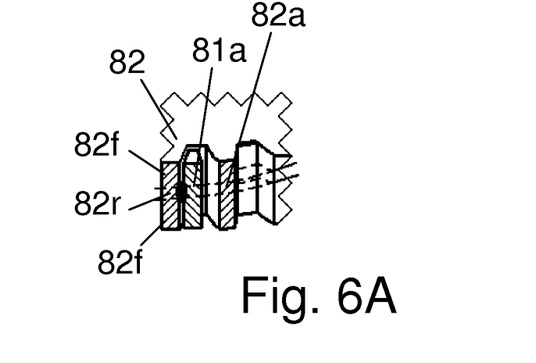
FIG. 6A is a sectional view through a part of a drive wheel and a driven wheel with infinitesimally thin toothing planes and axially supplemented filling material.

The ring 82*r* of the driven teeth 82*a* in FIG. 5 exhibits sufficient strength for normal operation, i.e. during the adjustment process of the adjuster 5. In extreme situations, for example when the adjuster 5 moves against a fixed stop, however, tooth forces may be produced which exceed the tooth forces of normal operation by many times. The required strength for these high loads may be achieved by the use of high-strength material which, however, is expensive, or by reinforcement. To this end, the ring 82*r* located obliquely to the axial direction, as shown in FIG. 5, and along which the driven teeth 82*a* are arranged, is supplemented by filling material 82*f* in the axial direction (FIG. 6A). For example, so much filling material 82*f* may be supplemented that the front faces of the driven wheel 82 are arranged parallel to one another, and extend perpendicular to the second rotational axis $A_2$. The front faces may, however, also be arranged and shaped differently.

Figure 6B:
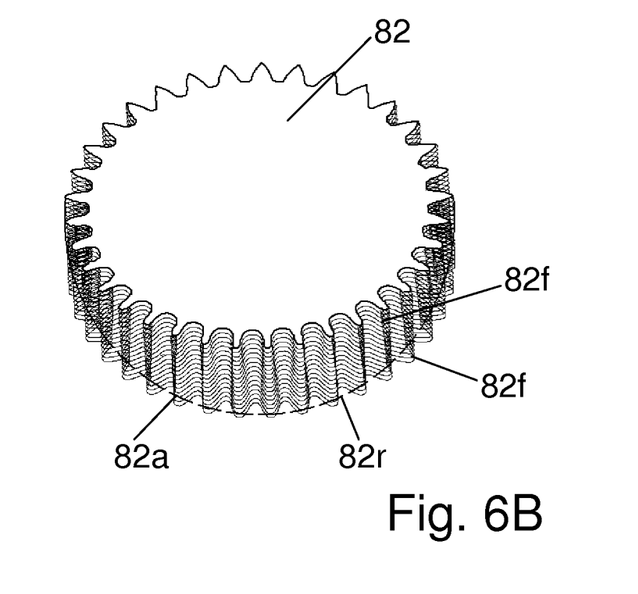
FIG. 6B is a perspective view of the driven wheel with infinitesimally thin toothing planes and axially supplemented filling material of FIG. 6A.
Figure 6C:
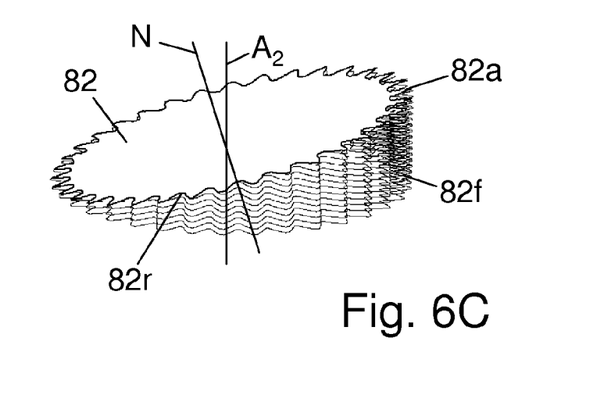
FIG. 6C is a sectional view through the driven wheel of FIG. 6B along the ring.

The driven wheel 82 supplemented by filling material 82*f* is shown in FIG. 6B. In order to indicate the axial dimensions, vertical lines are illustrated, i.e. the points of the driven teeth 82*a* with the same axial coordinates are joined together. The filling material 82*f* of the driven teeth 82*a*, supplemented for reinforcement, does not come into contact during the adjusting process of the drive wheel 81 and driven wheel 82 with the drive teeth 81*a* (i.e. remains without contact), thus has a minimum spacing from the drive teeth 81*a*. During the adjusting process, only one contact line or contact zone, which is defined by the ring 82*r* located in one plane (and a zone to the side thereof defined by the elasticity), comes into contact with the drive teeth 81*a*. The normal axis N, which is within the plane of the ring 82*r*—as in FIG. 5—is located obliquely to the second rotational axis $A_2$ of the driven wheel 82. For clarification of the position of the ring 82*r* and the normal axis N, FIG. 6C shows a section through the driven wheel of FIG. 6B along the ring 82*r*. The envelope of the driven teeth 82*a* may be a cylinder, but is preferably a cone, so that for example in FIG. 6B the lower driven teeth 82*a* in the lower region of the ring 82*r* have a greater radial dimension than in the upper region of the ring 82*r*. A small cone opening angle is preferred.

Only with high loads, for example when reaching a fixed stop or in the event of a crash, does the filling material 82*f* (preferably due to elastic deformation) also come into contact with the drive wheel 81, in order to improve the strength.

Figure 6D:
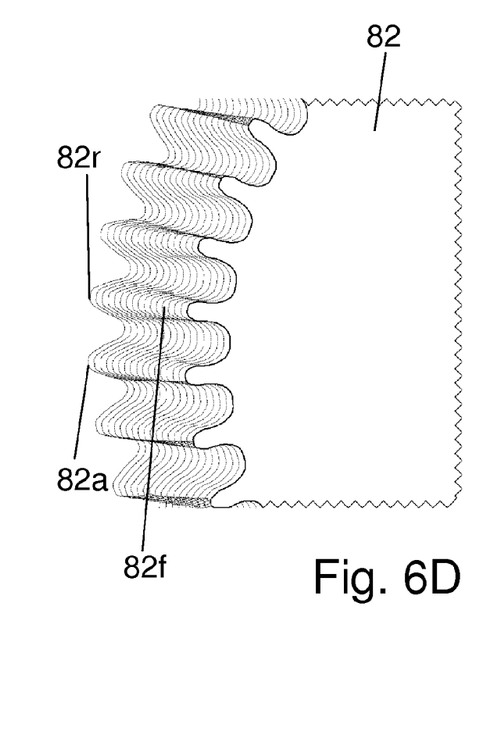
FIG. 6D is a partial view of the driven wheel of FIG. 6B.
Figure 6E:
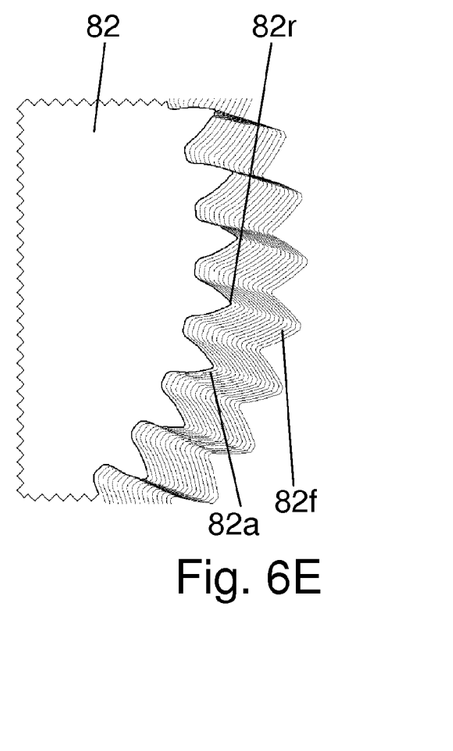
FIG. 6E is a further partial view of the driven wheel of FIG. 6B.

The driven teeth 82*a* of the driven wheel 82 of FIG. 6B preferably also have the already disclosed continuous alteration of the tooth parameters. For example, FIG. 6D shows this continuous alteration in the region of the largest gear ratio (corresponding to FIG. 2B) and FIG. 6E shows this continuous alteration in the region of the smallest gear ratio (corresponding to FIG. 2C).

In the disclosed embodiments, the drive teeth 81*a* have in each case in the circumferential direction the same shape and the same spacings (to the adjacent teeth), i.e. the drive wheel 81 has a cyclical symmetry. It is, however, also conceivable that the drive wheel 81 is asymmetrical relative thereto.

If undesirable axial forces in the drive wheel 81 and the driven wheel 82 due to the oblique position of the normal axis N to the second rotational axis $A_2$ are to be compensated, in a further exemplary embodiment (not shown) the drive wheel 81 and driven wheel 82 are mirrored on a plane extending perpendicular to the axial direction. The overall construction is then symmetrical again, whereby the axial forces of both wheel halves are mutually compensated. If the gear wheels 81, 82 are produced by plastics injection moulding, in particular with the driven wheel 82*a* clever arrangement of transverse slides in the tool is provided. Alternatively, the gear wheels 81, 82 are produced in two parts and joined by clip connections or other connection methods to the respective complete wheel.

The fluctuating gear ratio of the gear stage 8 may compensate the fluctuating torque requirement of the geared fitting 10 (and the structural parts fixed thereto), so that an almost constant torque is required for the drive 6 configured as a simple DC motor, i.e. the motor speed does not noticeably fluctuate which would cause disturbing noises.

While specific embodiments of the invention have been described in detail to illustrate the application of the principles of the invention, it will be understood that the invention may be embodied otherwise without departing from such principles.

APPENDIX

List of Reference Numerals

1 Vehicle seat
3 Seat part
4 Backrest
5 Adjuster
6 Drive
8 Gear stage
9 Shaft
10 Geared fitting
80 Housing
81 Drive wheel
81*a* Drive tooth
82 Driven wheel
82*a* Driven tooth
82*i* Inner tooth flank end
82*f* Filling material
82*o* Outer tooth flank end
82*r* Ring
$A_1$ First rotational axis
$A_2$ Second rotational axis
D Diagonal
N Normal axis

What is claimed is:

1. An adjuster for a vehicle seat, the adjuster comprising:
a drive;
a gear stage driven by the drive, the gear stage comprising a drive wheel comprising drive teeth, the drive wheel being rotatable about a first rotational axis and the gear stage comprising a driven wheel comprising driven teeth, the driven wheel being rotatable about a second rotational axis and meshing with the drive wheel with a fluctuating gear ratio; and
at least one load bearing gear driven by the gear stage, the at least one load bearing gear being a geared fitting with fitting parts performing a relative rotation with a superimposed wobble motion, wherein at least two of the drive teeth or at least two of the driven teeth in the circumferential direction of the associated rotational axis have different dimensions or different spacings from the adjacent teeth, or in the axial direction of the associated rotational axis has different dimensions or different axial positions, said drive wheel or the driven wheel being of frustoconical-like configuration, said drive teeth or driven teeth being arranged along a ring in one plane, a normal axis thereof being oblique to the associated rotational axis, wherein the ring of the drive teeth or of the driven teeth is supplemented by filling material in an axial direction, which remains without contact with the drive teeth during an adjusting process of the drive wheel and the driven wheel.

2. An adjuster according to claim 1, wherein the at least two drive teeth or the at least two driven teeth are arranged in different toothing planes in an axial direction, with dimensions or spacings being different between toothing planes.

3. An adjuster according to claim 1, wherein the drive wheel or the driven wheel has a cyclical symmetry.

4. An adjuster according to claim 1, wherein the rotational axes are arranged in parallel, offset to one another.

5. An adjuster according to claim 1, wherein the drive wheel or driven wheel is produced in multiple parts and is joined to build the respective complete wheel.

6. An adjuster according to claim 1, wherein the gear ratio of the gear stage fluctuates by a non-whole number value.

7. A motor vehicle seat comprising:
vehicle seat components; and
an adjuster connected to one or more of the vehicle seat components, the adjuster comprising:
an adjuster drive;
a gear stage connected to the adjuster drive and driven by the adjuster drive, the gear stage comprising a drive wheel comprising drive teeth, the drive wheel being rotatable about a first rotational axis and the gear stage comprising a driven wheel comprising driven teeth, the driven wheel being rotatable about a second rotational axis and meshing with the drive wheel with a fluctuating gear ratio, two of the drive teeth or two of the driven teeth in the circumferential direction of the associated rotational axis having different dimensions or different spacings from the adjacent teeth, or in the axial direction of the associated rotational axis having different dimensions or different axial positions, said drive wheel or the driven wheel being of frustoconical-like configuration, wherein said drive teeth or driven teeth are arranged along a ring in one plane, a normal axis thereof being oblique to the associated rotational axis, wherein the ring of the drive teeth or of the driven teeth is supplemented by filling material in an axial direction, which remains without contact with the drive teeth during an adjusting process of the drive wheel and the driven wheel; and a load bearing gear connected to the gear stage and driven by the gear stage, the load bearing gear being a geared fitting with fitting parts performing a relative rotation with a superimposed wobble motion.

8. A motor vehicle seat according to claim 7, wherein the at least two drive teeth or the at least two driven teeth are arranged in different toothing planes in an axial direction, with dimensions or spacings being different between toothing planes.

9. A motor vehicle seat according to claim 7, wherein the drive wheel or the driven wheel has a cyclical symmetry.

10. A motor vehicle seat according to claim 7, wherein the rotational axes are arranged in parallel, offset to one another.

11. A motor vehicle seat according to claim 7, wherein the drive wheel or driven wheel is produced in multiple parts and is joined to build the respective complete wheel.

12. A motor vehicle seat according to claim 7, wherein the gear ratio of the gear stage fluctuates by a non-whole number value.

13. An adjuster for a vehicle seat, the adjuster comprising:
a drive;
a gear stage driven by the drive, the gear stage comprising a drive wheel comprising drive teeth and a driven wheel comprising driven teeth, said drive wheel being rotatable about a first rotational axis, said driven wheel being rotatable about a second rotational axis, wherein said drive wheel is of frustoconical-like configuration;
a filling material; and
at least one load bearing gear driven by the gear stage, the at least one load bearing gear being a geared fitting with fitting parts performing a relative rotation with a superimposed wobble motion, wherein at least two of the driven teeth have different dimensions and different spacings from adjacent driven teeth in a circumferential direction of said second rotational axis, each of said drive teeth having different dimensions in an axial direction of said first rotational axis, each of said drive teeth having an outermost surface, said outermost surface being spaced from said first rotational axis by a radial distance, wherein said radial distance increases with respect to an axial direction of said drive wheel, wherein said outermost surface engages one or more of said driven teeth to provide a fluctuating gear ratio, said filling material engaging said outermost surface.

14. An adjuster according to claim 13, wherein said driven teeth are arranged along a ring in one plane, a normal axis thereof being oblique to the second rotational axis.

15. An adjuster according to claim 14, wherein said first rotational axis and said second rotational axis are arranged in parallel, offset to one another.

16. An adjuster according to claim 14, wherein at least two driven teeth are arranged in different toothing planes in an axial direction, with dimensions or spacings of said at least two driven teeth being different between toothing planes.

17. An adjuster according to claim 14, wherein said outermost surface extends continuously, without interruption, from an upper portion of said drive to a lower portion of said drive.

18. An adjuster according to claim 14, wherein said outermost surface defines a plurality of stepped portions, each of said stepped portions defining at least a portion of one of said drive teeth, each of said stepped portions being in a different tooth plane from an adjacent stepped portion with respect to the axial direction of said drive.

\* \* \* \* \*